A. AND F. TAMARIN AND M. HENDLER.
BED SPRING.
APPLICATION FILED MAR. 1, 1921.
1,394,511.
Patented Oct. 18, 1921.
2 SHEETS—SHEET 2.
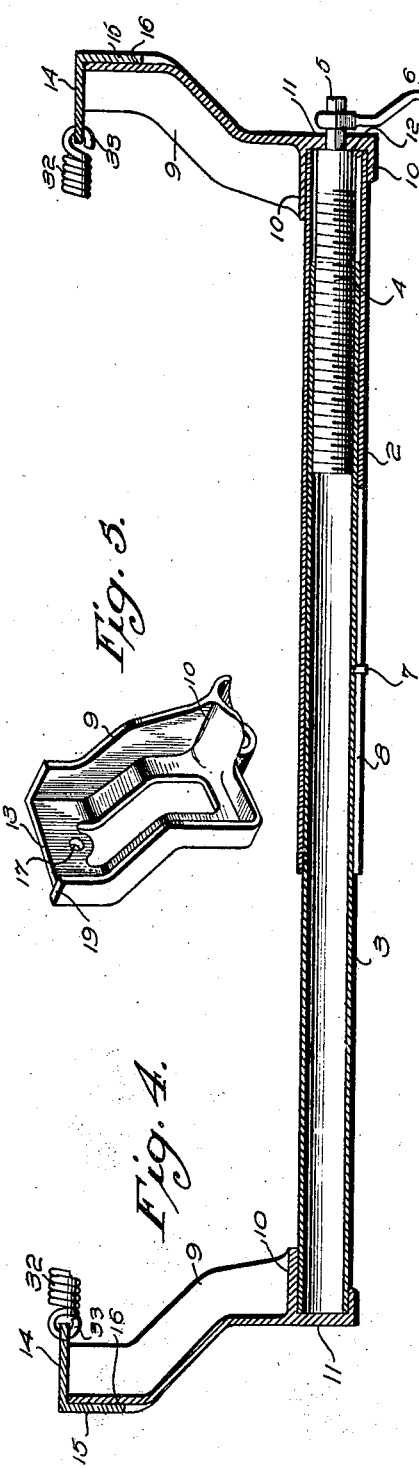
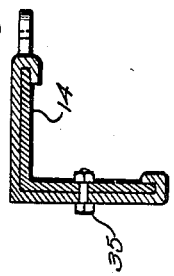
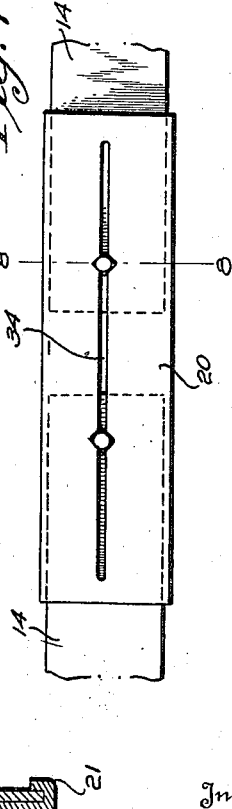
Inventor
ABRAHAM TAMARIN
FRANK TAMARIN
MAX HENDLER
By
Attorney

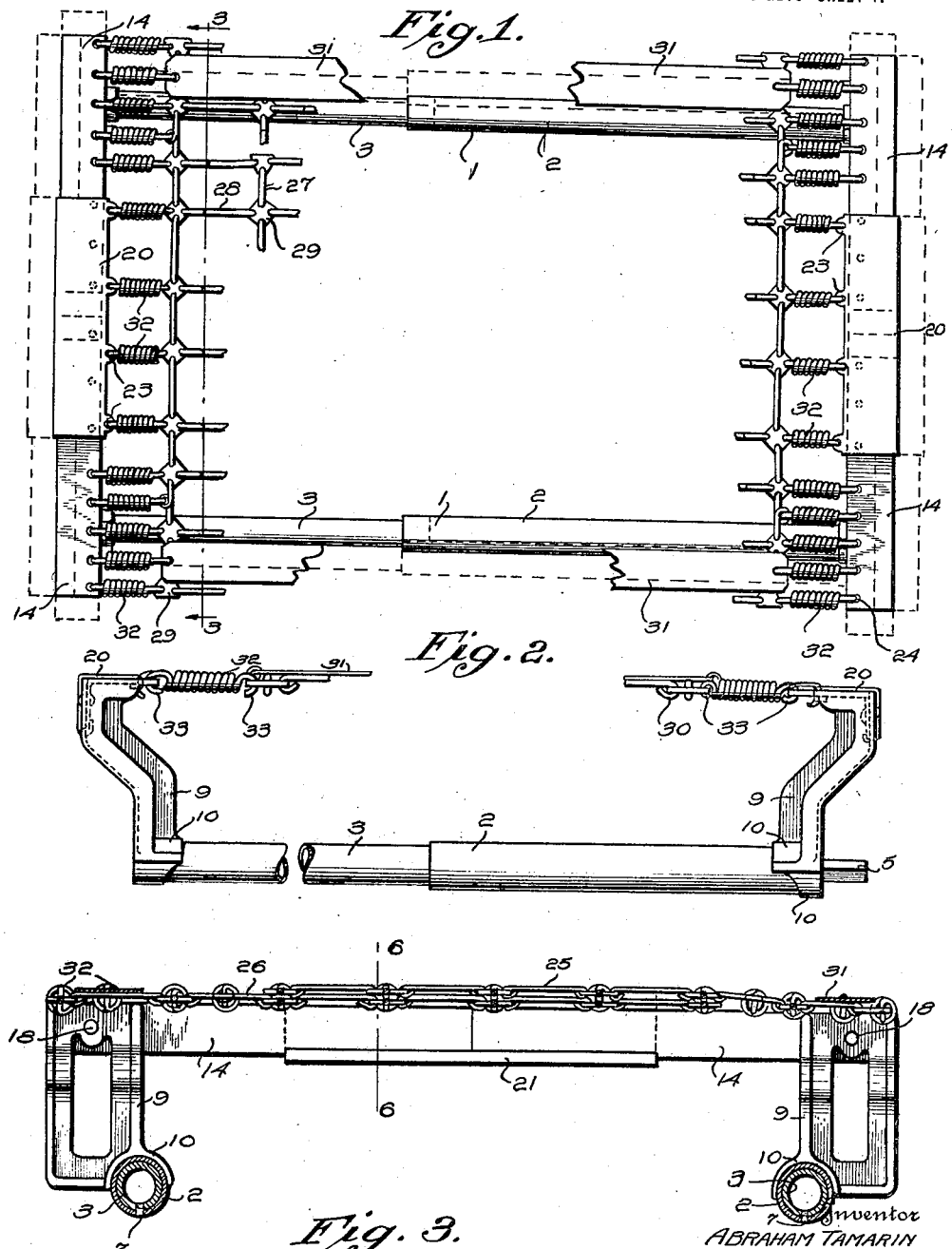

UNITED STATES PATENT OFFICE.

ABRAHAM TAMARIN, FRANK TAMARIN, AND MAX HENDLER, OF HUDSON, NEW YORK, ASSIGNORS TO KOMFYTITE SPRING AND BED CORPORATION, OF HUDSON, NEW YORK, A CORPORATION OF NEW YORK.

BED-SPRING.

1,394,511.    Specification of Letters Patent.    Patented Oct. 18, 1921.

Application filed March 1, 1921. Serial No. 448,773.

*To all whom it may concern:*

Be it known that we, ABRAHAM TAMARIN, FRANK TAMARIN, and MAX HENDLER, citizens of the United States, residing at Hudson, in the county of Columbia and State of New York, have invented certain new and useful Improvements in Bed-Springs, of which the following is a specification This invention relates to bed springs, and it comprises a frame having a pair of telescopic side bars, brackets mounted on the ends of the side bars, transverse members secured to said brackets, said transverse members being formed of two sections, one of which is secured to each bracket, a sleeve surrounding the adjacent ends of said transverse members, and a spring comprising a net work of wire and coil springs to connect said wire net work to said transverse members, said spring being formed in two sections, one of which is secured to each of said transverse members, the overlapping portions of said springs being secured to said bracket.

In the present invention, we have provided a bed spring that is adjustable both longitudinally and transversely. The longitudinal adjustment is obtained by means of telescopic side members, one of which is internally screw-threaded and is adapted to receive a threaded bolt or rod carried by the other member. The bolt or rod is provided with a projecting shaft for the reception of a handle to permit operation thereof to lengthen and shorten the bed.

The transverse adjustment is secured by means of transverse or end members which are formed in two sections and secured to brackets carried by the side bars. The free ends of the transverse sections are adapted to be received in a sleeve centrally arranged and adapted to form a continuous end member. The width of the bed is adjusted by adjusting the end sections in the sleeve.

The spring is also made of two sections, one of which is secured to each of said end sections by means of coil springs. When the bed is in contracted position forming a single width bed, the two springs are overlapped at the center, and are secured to the sleeve by means of coil springs, a single coil spring being used for securing the two springs. When the bed is to be adjusted, the securing means attached to the bracket are removed and the bed is first shortened to remove tension from the bed spring. After the bed has been adjusted, the coil springs are again arranged in engagement with the upper and lower ends of the bed spring and are then arranged in openings in the end members.

In the accompanying drawings, we have shown several embodiments of the invention. In this showing:

Figure 1 is a plan view, certain of the parts being broken away,

Fig. 2 is a side elevation,

Fig. 3 is a transverse sectional view on line 3—3 of Fig. 1,

Fig. 4 is a vertical longitudinal sectional view through the side member and brackets, Fig. 5 is a detail perspective view of one of the brackets.

Fig. 6 is a detail sectional view on line 6—6 of Fig. 3,

Fig. 7 is a detail view of a modified form of end member, and,

Fig. 8 is a sectional view on line 8—8 of Fig. 7.

Referring to the drawings, the reference numeral 1 designates generally the side bars which, as shown, are tubular in cross section and comprise a pair of telescopic members 2, and 3. The member 3 is adapted to be received within the member 2, and is internally threaded for engagement with the threads of a rod 4, arranged within the end of the member 2 to permit adjustment. The outer end of the rod is provided with a squared shaft 5 for the reception of an operating crank 6. As shown, the member 3 is provided with a pin or projection 7 adapted to be received in a slot 8 formed in the member 2 to prevent relative rotation.

A bracket 9 is arranged on each end of the side bars. The bracket is provided with a sleeve 10 for the reception of the side bar and an end plate 11. The end plate on the end adjacent the operating rod is adapted to be engaged by the face 12 of the rod when the bed is being lengthened. The upper edge of the bracket is flat, as at 13, and is adapted to be received beneath the horizontal portion of the end section 14. The end section, as shown, is formed of angle iron and is provided with a vertical portion 15, adapted to be arranged beside the vertical portion 16 of the bracket. These members are provided with openings 17, for the reception of a bolt or screw 18 to secure the end section to the bracket. As shown, the bracket may be provided with an end flange 19 which is adapted to abut the end of the end section.

The end member comprises a pair of sections adapted to be secured to the pair of brackets at each end of the bed spring in the manner described. The free ends of the end sections are adapted to be received in a sleeve or member 20 which is also formed of angle iron and is provided with a flange 21 at its lower end to form a guide for the end sections. The upper end is provided with a plurality of lips 22 which are adapted to be arranged beneath the outer edge of the horizontal portion of the end section to retain it in position. Between the lips, a plurality of ears 23 are provided having openings for the reception of the ends of the bed spring. The end sections are also provided with openings 24, spaced from each other as shown.

The bed spring is formed in two sections 25 and 26, one section being secured to one end section at each end of the bed. The bed spring is of the usual construction, and comprises a plurality of transverse members 27 and longitudinal members 28, connected to each other by means of plates 29 having openings therein for the reception of the curled ends 30 of the members 27 and 28. Each section of the spring is provided with a reinforcing plate 31, of spring metal or other substantially rigid material, adjacent its outer edge. Coil springs 32 are arranged at the ends of the sections of the bed spring, the ends of the coil springs, being formed in loops 33, one of which is adapted to be received by the plates 29 and the other being adapted to be arranged in openings 24.

Referring to Fig. 3 of the drawings, it will be seen that when the bed is contracted to form a single width bed, the sections of the bed spring will overlap. The overlapping portions are connected to the openings formed in the ears 23, and the outer end of the coil spring is adapted to be passed through the openings in the two plates 29, arranged in alinement with each other. (See Fig. 6).

When the bed is to be adjusted, the side members are first shortened to relieve the tension of the spring. This is done by revolving the threaded rod 4 and drawing the member 3 within the member 2. After the tension has been removed from the spring, the portions of the bed springs 25 and 26 which are secured to the sleeve 20 are released by removing the coil springs and the bed adjusted to the desired width. Coil springs are then arranged in the openings in ears 23 and in the openings 24, which move into position to receive the coil springs when the end sections are drawn out of sleeve 20. Additional coil springs are provided to furnish the necessary number for use when the bed is extended to its full width.

In the modification shown in Figs 7 and 8 of the drawings, the sleeve 20 is provided with a slot 34 for the reception of a bolt 35, carried by the end member 14. This construction provides additional strength and limits the movement of the end sections 14 in the sleeve to prevent them from being entirely withdrawn.

In lengthening the frame to place the bed spring under tension, the rod 4 is turned in the opposite direction and the engagement of the face 12 with the end plate 11 of the bracket forces the member 2 outwardly away from the member 3.

By means of the construction disclosed, we provide an adjustable bed spring of very simple construction and as substantial and rigid as the ordinary non-adjustable bed spring. The provision of a central adjustment with a sleeve for receiving the sections of the end member affords the strength of a single piece and the employment of a bed spring formed in two sections 25 and 26 is particularly advantageous.

It is to be understood that the forms of our invention herewith shown and described are to be taken as preferred examples of the same, and that various changes in the shape, size, and arrangement of parts may be resorted to without departing from the spirit of the invention or the scope of the subjoined claims.

Having thus described our invention, we claim:

1. An adjustable bed spring comprising a pair of telescopic side members, brackets arranged on the ends of said side members, an end member secured to the pair of brackets at each end of the spring, said end members comprising a pair of angle irons, one of which is secured to each of said brackets, an angle iron member arranged to receive the adjacent ends of said angle irons, said member being provided with flanges to retain said angle irons in position, and a spring structure comprising a pair of sections, each of said sections being secured at its ends to said angle irons, said spring structures being overlapped at the center and secured to said angle iron member.

2. An adjustable bed spring comprising a pair of telescopic side members, brackets arranged on the ends of said side members, an end member secured to the pair of brackets at each end of the spring, said end members comprising a pair of angle irons, one of which is secured to the bracket at each side of the spring, and an angle iron member adapted to receive the adjacent ends of said angle irons, said angle iron member being provided with flanges on its edges to retain said angle irons in position, the inner edge of said angle irons and said angle iron member being provided with spaced openings, and a spring structure comprising two sections adapted to overlap at the center, said spring structures being secured to said angle irons and the overlapped portions thereof being secured to said angle iron member.

In testimony whereof we affix our signatures in presence of two witnesses.

ABRAHAM TAMARIN.
FRANK TAMARIN.
MAX HENDLER.

Witnesses:
HAROLD E. FRITTS,
FLORENCE KESTENBAUM.